US008780406B2

(12) United States Patent
Tanioka

(10) Patent No.: US 8,780,406 B2
(45) Date of Patent: Jul. 15, 2014

(54) METHOD FOR CREATING DRIVE PATTERN FOR GALVANO-SCANNER SYSTEM

(75) Inventor: Nozomu Tanioka, Nagano (JP)

(73) Assignee: Harmonic Drive Systems Inc. (JP)

( * ) Notice: Subject to any disclaimer, the term of this patent is extended or adjusted under 35 U.S.C. 154(b) by 911 days.

(21) Appl. No.: 12/992,937

(22) PCT Filed: May 16, 2008

(86) PCT No.: PCT/JP2008/001237
§ 371 (c)(1),
(2), (4) Date: Nov. 16, 2010

(87) PCT Pub. No.: WO2009/139026
PCT Pub. Date: Nov. 19, 2009

(65) Prior Publication Data
US 2011/0304836 A1    Dec. 15, 2011

(51) Int. Cl.
*G06K 15/12*    (2006.01)

(52) U.S. Cl.
USPC .......... 358/1.7; 358/509; 358/475; 358/505; 358/474; 358/481; 219/121.78; 219/121.82; 250/559.29; 250/559.3; 250/559.32; 347/236; 347/237; 347/243; 347/259; 347/261; 359/197.1; 359/198.1; 359/201.2; 359/203.1

(58) Field of Classification Search
CPC ....... H04N 3/08; H04N 3/10; G02B 27/0031; B23K 26/0807; B23K 26/0853
USPC .......... 358/1.7, 509, 475, 505, 474, 481, 487; 219/121.78–121.81, 121.82; 250/559.29, 559.3, 559.32, 234–236; 347/224–225, 236–237, 243, 246–247, 347/259–261; 359/197.1–200.8, 359/201.2–203.1

See application file for complete search history.

(56) References Cited

U.S. PATENT DOCUMENTS

| 5,245,181 | A | * | 9/1993 | Cho | 250/236 |
| 5,892,533 | A | * | 4/1999 | Tanimoto et al. | 347/257 |
| 5,995,246 | A | * | 11/1999 | Komiya et al. | 358/481 |
| 6,381,356 | B1 | * | 4/2002 | Murakami et al. | 382/141 |
| 7,242,506 | B2 | * | 7/2007 | Kandori et al. | 359/196.1 |
| 2005/0277305 | A1 | * | 12/2005 | Tanioka | 438/788 |

FOREIGN PATENT DOCUMENTS

| JP | 2003-220485 A | 8/2003 |
| JP | 2005-262311 A | 9/2005 |

OTHER PUBLICATIONS

International Search Report for International Application No. PCT/JP2008/001237 mailed Jul. 8, 2008 with English translation.

* cited by examiner

*Primary Examiner* — Benny Q Tieu
*Assistant Examiner* — Quyen V Ngo
(74) *Attorney, Agent, or Firm* — Cantor Colburn LLP

(57) ABSTRACT

A visible laser beam scanned by a galvano-scanner system is aligned at each of positioning points on the top surface of a master work by manual operation to record sensor position signals of position sensors on galvano-scanners. The sensor position signals on each positioning point are recorded to create a drive pattern in accordance with recorded sensor position signals. The drive pattern no longer has optics system error sources including focus error and attachment error as well as errors caused by scale, offset and the like, also eliminating the need for entering a distance as far as the top surface of the work. Therefore, the drive pattern with error components removed can be created with ease.

4 Claims, 12 Drawing Sheets

FIG. 4

| Step | Time | X-Axis | Y-Axis | Laser | Duration of Movement | Amount of Movement In X-Axis | Amount of Movement In Y-Axis | Maximum Amount of Movement | Calculated Duration of Movement |
|---|---|---|---|---|---|---|---|---|---|
| 1 | 0 | 0 | 0 | 0 | 0 | | | | |
| 2 | 0.8 | -2 | 8 | 1 | 0.8 | 2 | 8 | 8 | 0.8 |
| 3 | 1.4 | -2 | 2 | 1 | 0.6 | 0 | 6 | 6 | 0.6 |
| 4 | 2.6 | 10 | 2 | 1 | 1.2 | 12 | 0 | 12 | 1.2 |
| 5 | 3.6 | 10 | -8 | 1 | 1 | 0 | 10 | 10 | 1 |
| 6 | 5.6 | -10 | -8 | 1 | 2 | 20 | 0 | 20 | 2 |
| 7 | 7.2 | -10 | 8 | 1 | 1.6 | 0 | 16 | 16 | 1.6 |
| 8 | 8 | -2 | 8 | 0 | 0.8 | 8 | 0 | 8 | 0.2 |
| 9 | 8.2 | 2 | 8 | 1 | 0.2 | 4 | 0 | 4 | 0.8 |
| 10 | 9 | 10 | 8 | 1 | 0.8 | 8 | 0 | 8 | 0.4 |
| 11 | 9.4 | 10 | 4 | 1 | 0.4 | 0 | 4 | 4 | 0.8 |
| 12 | 10.2 | 2 | 4 | 1 | 0.8 | 8 | 0 | 8 | 0.4 |
| 13 | 10.6 | 2 | 8 | 1 | 0.4 | 0 | 4 | 4 | 0.4 |
| 14 | 11 | 0 | 0 | 0 | 0.4 | 2 | 8 | 8 | 0.4 |

Movement Speed When Laser is in an ON State [mm/s] 10
Movement Speed When Laser is in an OFF State [mm/s] 20

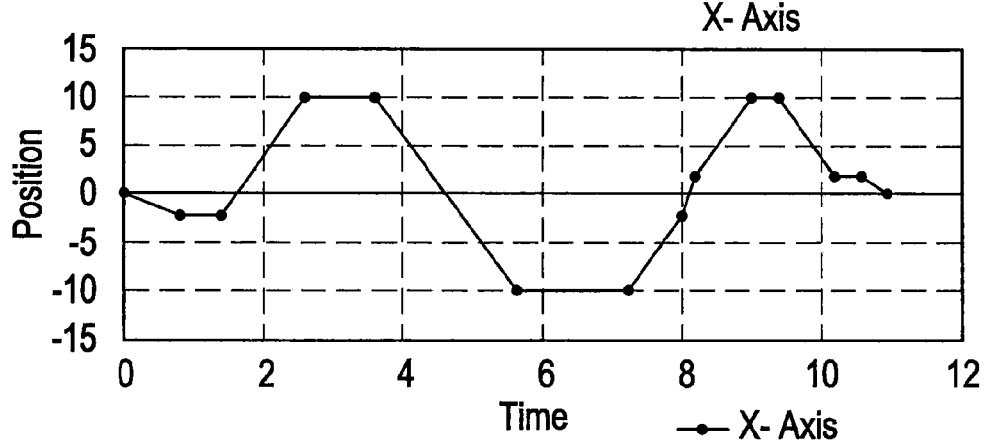
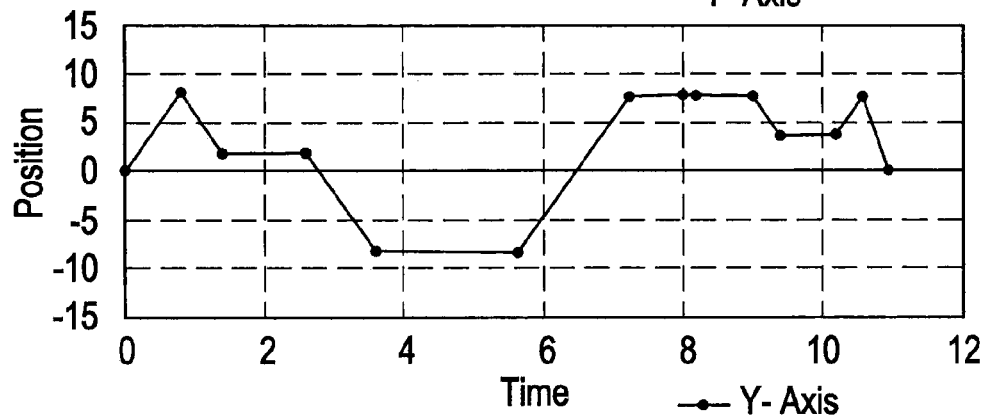
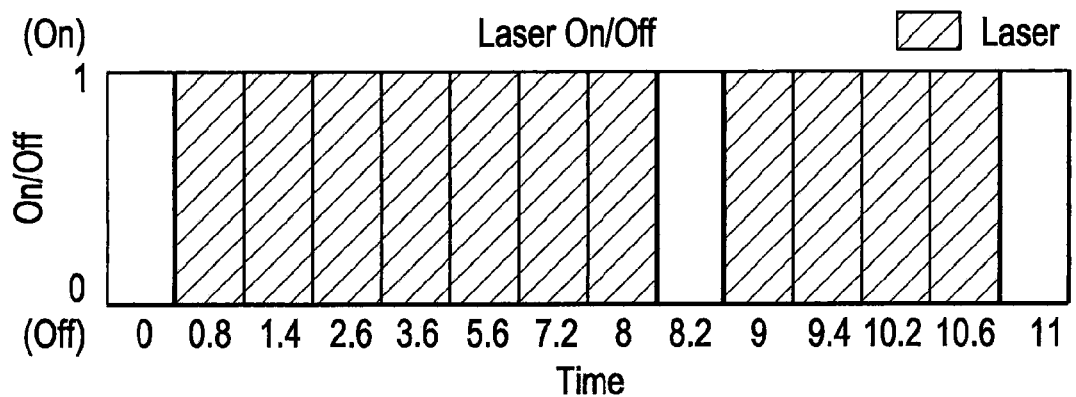

Ideal Rectangle Created on Pc → Pin Cushion Error Resulting from Scanning without Correction Points Inputted According to Teaching Design Value Input Without Accounting for Error Barrel-Shaped Corrected Data are Processed ⇒ Results in an Ideal Rectangle Instance in Which Vibration Width is Smaller Than That According to Adjustment Conditions Instance in Which Vibration Width is Greater Than That According to Adjustment Conditions

FIG. 8A

| Step | Time | X-Axis | Y-Axis | Laser | Duration of Movement | Amount of Movement In X-Axis | Amount of Movement In Y-Axis | Maximum Amount of Movement | Speed | Calculated Duration of Movement |
|---|---|---|---|---|---|---|---|---|---|---|
| 1 | 0 | 0 | 0 | 0 | 0 | | | | | |
| 2 | 0.025 | -5 | 10 | 0 | 0.025 | 5 | 10 | 10 | 400 | 0.025 |
| 3 | 0.525 | -5 | 5 | 1 | 0.5 | 0 | 5 | 5 | 10 | 0.5 |
| 4 | 1.025 | -10 | 5 | 1 | 0.5 | 5 | 0 | 5 | 10 | 0.5 |
| 5 | 1.525 | -10 | 10 | 1 | 0.5 | 0 | 5 | 5 | 10 | 0.5 |
| 6 | 2.025 | -5 | 10 | 1 | 0.5 | 5 | 0 | 5 | 10 | 0.5 |
| 7 | 3.025 | 5 | 10 | 0 | 1 | 10 | 0 | 10 | 10 | 1 |
| 8 | 3.525 | 10 | 10 | 1 | 0.5 | 5 | 0 | 5 | 10 | 0.5 |
| 9 | 3.5375 | 10 | 5 | 1 | 0.0125 | 0 | 5 | 5 | 400 | 0.0125 |
| 10 | 4.0375 | 5 | 5 | 1 | 0.5 | 5 | 0 | 5 | 10 | 0.5 |
| 11 | 4.5375 | 5 | 10 | 1 | 0.5 | 0 | 5 | 5 | 10 | 0.5 |
| 12 | 4.5625 | 0 | 0 | 0 | 0.025 | 5 | 10 | 10 | 400 | 0.025 |
| 13 | | | | | | | | | | |
| 14 | | | | | | | | | | |

Movement Speed When Laser is in an ON State [rad/s] 10
Movement Speed When Laser is in an OFF State [rad/s] 400

FIG. 9A

| Step | Time | X-Axis | Y-Axis | Laser | Duration of Movement | Amount of Movement In X-Axis | Amount of Movement In Y-Axis | Maximum Amount of Movement | Speed | Calculated Duration of Movement |
|---|---|---|---|---|---|---|---|---|---|---|
| 1 | 0 | 0 | 0 | 0 | 0 | | | | | |
| 1a | 0.0225 | -4 | 9 | - | 0.0225 | 4 | 9 | 9 | 400 | 0.0225 |
| 2 | 0.1225 | -5 | 10 | 1 | 0.1 | 1 | 1 | 1 | 10 | 0.1 |
| 3 | 0.6225 | -5 | 5 | 1 | 0.5 | 0 | 5 | 5 | 10 | 0.5 |
| 4 | 1.1225 | -10 | 5 | 1 | 0.5 | 5 | 0 | 5 | 10 | 0.5 |
| 5 | 1.6225 | -10 | 10 | 1 | 0.5 | 0 | 5 | 5 | 10 | 0.5 |
| 6 | 2.1225 | -5 | 10 | 0 | 0.5 | 5 | 0 | 5 | 10 | 0.5 |
| 7 | 3.1225 | 5 | 10 | 1 | 1 | 5 | 0 | 10 | 10 | 1 |
| 8 | 3.6225 | 10 | 10 | 1 | 0.5 | 5 | 0 | 5 | 10 | 0.5 |
| 8a | 3.6325 | 10 | 6 | - | 0.01 | 0 | 4 | 4 | 400 | 0.01 |
| 9 | 3.7325 | 10 | 5 | 1 | 0.1 | 0 | 1 | 1 | 10 | 0.1 |
| 10 | 4.2325 | 5 | 5 | 1 | 0.5 | 5 | 0 | 5 | 10 | 0.5 |
| 11 | 4.7325 | 5 | 10 | 0 | 0.5 | 0 | 5 | 5 | 10 | 0.5 |
| 11a | 4.755 | 1 | 1 | - | 0.0225 | 4 | 9 | 9 | 400 | 0.0225 |
| 12 | 4.855 | 0 | 0 | 0 | 0.1 | 1 | 1 | 1 | 10 | 0.1 |

Movement Speed When Laser is in an ON State [rad/s] 10
Movement Speed When Laser is in an OFF State [rad/s] 400
Trim [rad/s] 10

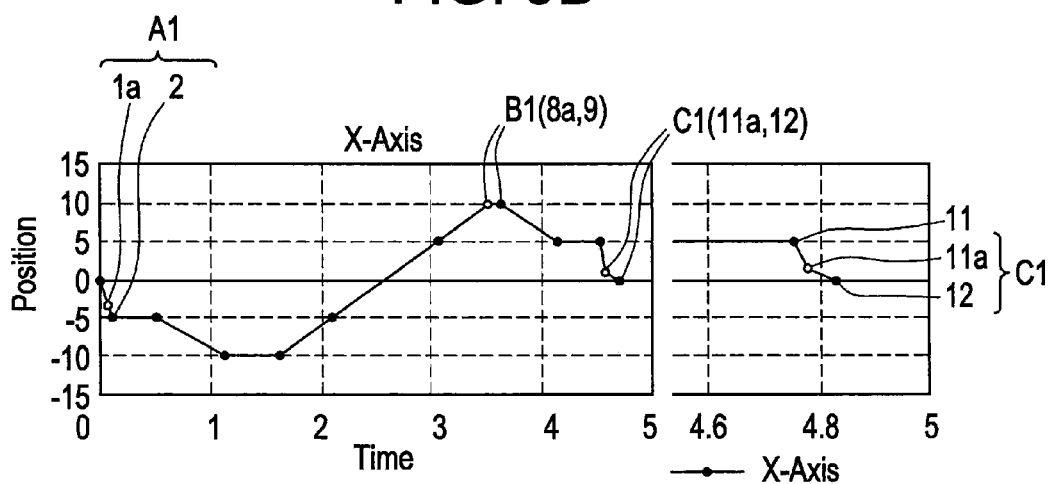
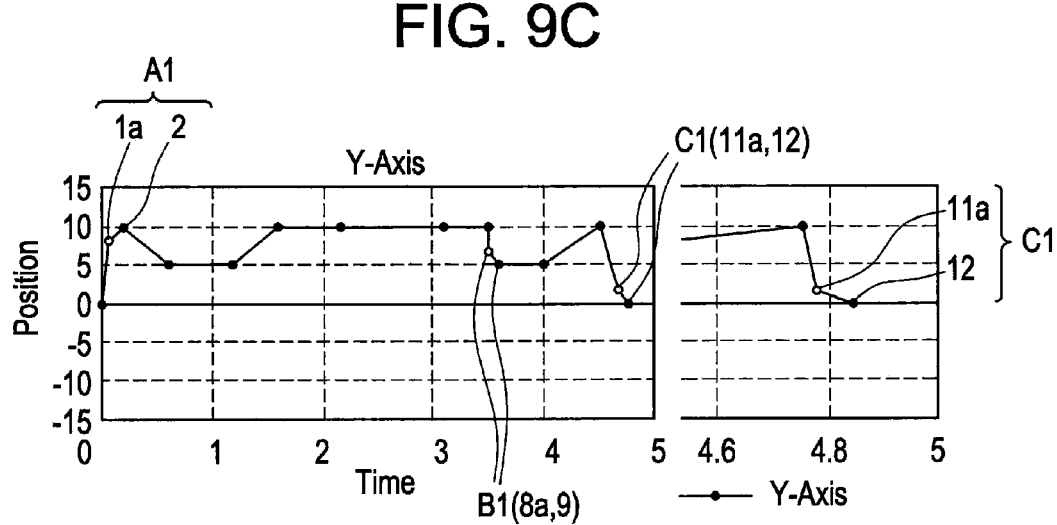

METHOD FOR CREATING DRIVE PATTERN FOR GALVANO-SCANNER SYSTEM

This is a U.S. national stage application of International Application No. PCT/JP2008/001237, filed on 16 May 2008, the disclosure of which is incorporated herein by reference.

TECHNICAL FIELD

The present invention relates to a method for creating a drive pattern for a galvano-scanner system, wherein a visible laser beam is scanned via each positioning point on a surface of a work, and a drive pattern for scanning a main laser beam is thereby created.

BACKGROUND ART

A galvano-scanner system is used to scan a laser beam according to a predetermined drive pattern in a laser processing device or a similar device. For example, in a laser marking device, there is provided a galvano-scanner system comprising an x-axis galvano-scanner and a y-axis galvano-scanner, a laser beam emitted from a laser beam source is two-dimensionally scanned by the scanners along a surface of a work according to a predetermined drive pattern, and a predetermined marking is applied to the work surface.

A drive pattern input command for a conventional galvano-scanner system is created by entering, in a manner similar to that for a timing chart, coordinates data representing a plurality of positioning points for defining the drive pattern, a sequence of each of the positioning points, and the speed of scan between each of the positioning points, using an higher-level device provided with a PC for controlling the galvano-scanner system; then adding a large amount of information that has been designed in advance, including the distance to a work surface, data for correcting distortion by an optics system, and response characteristics of the galvano-scanner. Therefore, in order to create a drive pattern input command, it is necessary to enter a large amount of information, and to set the information in advance. Therefore, creation of a drive pattern input command is time-consuming and requires a certain amount of preparation time and relevant expertise.

There is disclosed, in patent reference 1, a laser marking device provided with a function of projecting, using a guide laser beam, a guide image onto a work via a galvano-mirror, the guide image following a required pattern of printing. In the laser marking device, the galvano-mirror is caused to turn according to the same coordinates data as that used during a printing operation, a point of irradiation of the guide laser beam is thereby scanned on the work, and the print pattern guide image is projected on a surface of the work. An error between a position of guide image projection and a desired position on the work is thereby identified, making it possible to perform print position correction before printing commences. Therefore, in contrast to an instance in which actual printing is performed on a sample work and print position correction is performed, there is no need to make a sample work available, and print position correction can be performed with relative ease.

[Patent reference 1] JP-A 2003-220485

DISCLOSURE OF THE INVENTION

Problems to be Solved by the Invention

An object of the present invention is to propose a method for creating a drive pattern for a galvano-scanner system, wherein a surface of a work is scanned using a visible laser beam (i.e., a guide laser beam), and a drive pattern for scanning a main laser beam, such as a laser beam for marking, is thereby created with ease.

Means Used to Solve the Above-Mentioned Problems

In order to solve the above-mentioned problems, the present invention is a method for creating a drive pattern for a galvano-scanner system comprising a galvano-scanner capable of scanning a main laser beam and a visible laser beam in a predetermined direction, a scanner driver for driving the galvano-scanner, and a controller for controlling the scanner driver, the method for creating a drive pattern for a galvano-scanner system characterized in comprising:

making available a master work, having displayed on a surface a plurality of positioning points for defining a scan trajectory followed by the main laser beam;

sequentially performing, for each of the positioning points, a teaching operation in which the visible laser beam is irradiated onto the surface of the master work, the galvano-scanner is operated by manual operation via the scanner driver, a position of irradiation of the visible laser beam on the surface is aligned at one of the positioning points by visual observation, position information of the aligned galvano-scanner is obtained from a position sensor attached to the galvano-scanner, and the position information is recorded;

deploying the position information obtained for each of the positioning points in a sequence in which each of the position information was obtained, and determining a trajectory over which the visible laser beam moves;

setting, individually or as a whole, a duration of movement within each section of movement on the movement trajectory;

setting the main laser beam in an on/off state at each position of movement on the movement trajectory; and generating an input command for a pattern for driving the main laser beam based on the movement trajectory, the duration of movement, and the information relating to the on/off state of the main laser beam.

In the present invention, the visible laser beam scanned by the galvano-scanner system is irradiated onto the surface of the master work, and the galvano-scanner position information is recorded at a position at which a positioning point and a spot of irradiation of the visible laser beam coincide. Operation of the galvano-scanner system at this time is performed by a teaching operation by the controller, and therefore does not require a drive pattern entered in advance. Alignment of the visible laser beam irradiation spot is repeated a required number of times, and the position and sequence of each of the positioning points are recorded. Position information thus obtained contains the effect of distortion by an optics system. Therefore, errors originating from optics system error causes including focus error (pin cushion error) and attachment error, scale, offset, and other causes of error are already removed from the input command for a drive pattern created according to the obtained position information. The need for entering a distance to the surface of the work is also eliminated. An input command for a drive pattern with error components removed can thereby be created with ease.

For uses that do not require a high responsiveness and a high positioning accuracy, the scan speed of the main laser beam can be made constant to create a drive pattern for a galvano-scanner system without a need for an operation in which a numerical value is entered and the scan speed is set.

On the other hand, for use in laser processing and other uses in which a high positioning accuracy is required, an operation of setting the scan speed by entering a numerical value may be performed.

Next, in order to two-dimensionally scan the main laser beam along the work surface, the galvano-scanner system generally has an x-axis galvano-scanner and a y-axis galvano-scanner, each of which scanners being capable of scanning the main laser beam and the visible laser beam in an x-axis direction and a y-axis direction respectively; an x-axis scanner driver for driving the x-axis galvano-scanner; a y-axis scanner driver for driving the y-axis galvano-scanner; and a controller for controlling the x-axis scanner driver and the y-axis scanner driver.

A drive pattern can also be created in this instance in a similar manner. First, a master work, having a plurality of positioning points for defining a scan trajectory of the main laser beam displayed on a surface, is made available. Next, a positioning point teaching operation is performed, in which the visible laser beam is irradiated onto the surface of the master work, the x-axis galvano-scanner and the y-axis galvano-scanner are operated by manual operation via each of the x-axis scanner driver and the y-axis scanner driver to align a position of irradiation of the visible laser beam on the surface at one of the positioning points by visual observation, x-axis position information and y-axis position information of the x-axis galvano-scanner and the y-axis galvano-scanner in an aligned state are respectively obtained from an x-axis position sensor and a y-axis position sensor respectively attached to the x-axis galvano-scanner and the y-axis galvano-scanner, and the position information is recorded. The x-axis position information and the y-axis position information obtained for each of the positioning points are deployed in x-y coordinates in a sequence in which each of the types of position information is obtained; a movement trajectory of the visible laser beam is determined; a duration of movement within each section of movement on the movement trajectory is set individually or as a whole, and an on/off state of the main laser beam at each position of movement on the movement trajectory is set. Then, an input command for a pattern for driving the main laser beam is set based on the movement trajectory, the duration of movement, and the on/off state information of the main laser beam.

Next, the method for creating a drive pattern for a galvano-scanner system according to the present invention is characterized in comprising:
  determining a difference between design coordinates representing each of the positioning points defining the scan trajectory followed by the main laser beam and measurement coordinates representing each of the positioning points obtained by the teaching operation;
  calculating, based on the difference, a correction map or a correction formula representing an error correction amount for each of the design coordinates positions;
  performing a correction, using the correction map or the correction formula, on the design coordinates for aligning the main laser beam at a predetermined positioning point; and
  generating a drive input command corresponding to the coordinates after correction.

In the present invention, the teaching operation is performed using the master work to obtain the correction map or the correction formula, which is used to perform correction on a design input value for driving, and an error is removed. Therefore, in an instance where scanning of laser beam is performed on various works, it is possible to eliminate the trouble of performing the teaching operation each time, for example, the laser beam is scanned according to a different drive pattern. In an instance where distortion by the optics system is complex, e.g., in an instance where a large number of causes of error are present, the number of teaching iterations performed on the positioning points can be increased to perform error correction on the design input value with a high degree of accuracy.

Next, the method for creating a drive pattern for a galvano-scanner system according to the present invention is characterized in comprising:
  extracting a section of movement in which overshooting is likely to occur, when scanning the main laser, at a positioning completion point in each section of movement in a generated drive pattern;
  inserting an auxiliary section of movement, provided with a drive condition that can minimize overshooting, forward of the positioning completion point of the extracted section of movement;
  causing an end point of the auxiliary section of movement to coincide with the positioning completion point; and
  using an amended drive pattern after insertion of the auxiliary section of movement as an input command for the main laser beam.

The drive pattern can thus be amended to minimize overshooting of the galvano-scanner at the positioning completion point and associated vibration.

Effect of the Invention

According to the method for creating a drive pattern for a galvano-scanner system of the present invention, a visible laser beam is scanned along each of the positioning points displayed on the surface of the master work, positional information of the galvano-scanner in a state of being aligned at each of the positioning points is obtained, and a drive pattern for scanning the main laser beam is created based on the positional information. Therefore, it is possible to create, through a simple procedure and in a short space of time, a drive pattern from which errors arising from distortion of the optics system of the galvano-scanner, the response characteristics of the galvano-scanner, the distance to the work surface, and other causes of error are removed, without performing an operation of entering correction data or similar data for removing the effect of such errors.

BRIEF DESCRIPTION OF THE DRAWINGS

FIG. 4 is a table showing a created drive pattern;

FIG. 5(a) is an illustrative drawing showing an x-axis movement trajectory of the drive pattern shown in FIG. 4;

FIG. 5(b) is an illustrative drawing showing a y-axis movement trajectory of the same;

FIG. 5(c) is an illustrative drawing showing a drive pattern of laser on/off states of the same;

FIG. 9 is a table showing a drive pattern for an instance in which a section of movement is added forward of a positioning completion point of each section of movement in which overshooting occurs, a graph showing a corresponding X-axis drive pattern, and a graph showing a corresponding Y-axis drive pattern.

BEST MODE FOR CARRYING OUT THE INVENTION

An embodiment of a galvano-scanner system in which the present invention is applied will now be described with reference to the accompanying drawings.

First Embodiment

Figure 1:
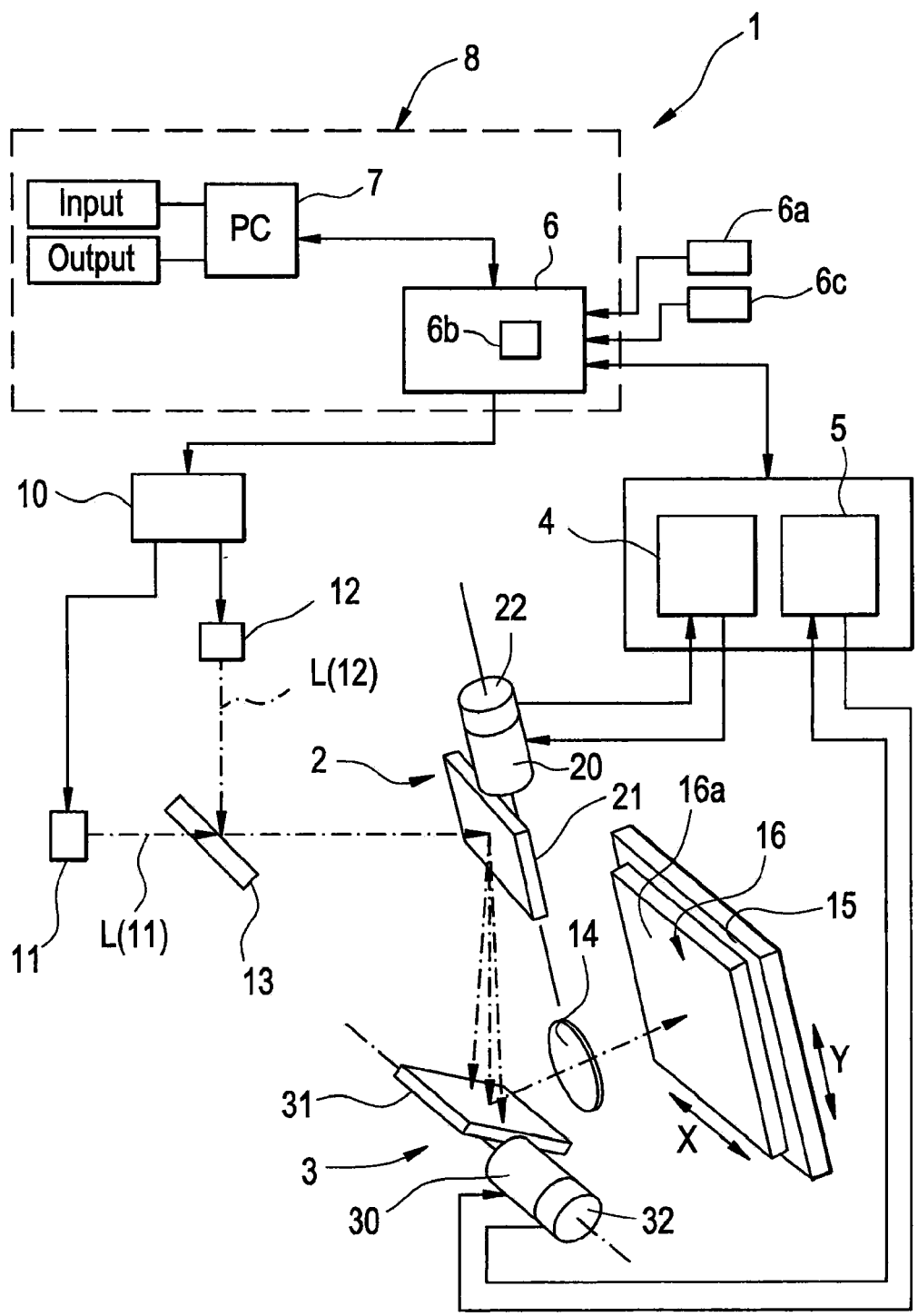
FIG. 1 is a schematic galvano-scanner system in which the present invention is applied.

FIG. 1 is a schematic diagram of a galvano-scanner system according to a first embodiment. A galvano-scanner system 1 comprises an x-axis galvano-scanner 2; a y-axis galvano-scanner 3; an x-axis scanner driver 4 and a y-axis scanner driver 5 for driving the galvano-scanners; and a command generator 8, the command generator 8 having an analog controller 6 and a personal computer 7 or a similar device, for controlling the x-axis and y-axis scanner drivers 4, 5.

The galvano-scanner system 1, used as, for example, a laser marking device, comprises a marking laser beam source 11 and a visible laser beam source 12. The marking laser beam source 11 is driven via a driver 10 to generate a marking laser beam L (11), which is irradiated onto an x-axis scanning mirror 21 of the x-axis galvano-scanner 2 via a half mirror 13 used as a beam path combining element. The marking laser beam L (11) is reflected by the x-axis scanning mirror 21, then irradiated onto a y-axis scanning mirror 31 of the y-axis galvano-scanner 3. After being reflected by the y-axis scanning mirror 31, the marking laser beam L (11) is irradiated, via an fθ lens 14 or another collecting lens, onto a surface 16a of a work 16 installed on a work table 15. A visible laser beam L(12) emitted from a visible laser beam source 12 is reflected at a right angle by the half mirror 13, then guided through a beam path identical to that of the marking laser beam L (11), and again irradiated onto the surface 16a of the work 16.

A dedicated program for generating a command is installed on the personal computer 7 of the command generator 8, and a digital position command for the x-axis and y-axis scanner drivers 4, 5 is fed to the analogue controller 6. The analog controller 6 performs a digital-to-analog conversion to convert the digital position command into a command voltage representing an analog position command, and feeds the command voltage to the x-axis and y-axis scanner driver 4, 5. The x-axis and y-axis scanner drivers 4, 5 generate a scanner drive voltage based on the command voltage, apply the scanner drive voltage on the x-axis and y-axis galvano-scanners 2, 3, and drive the x-axis and y-axis galvano-scanners 2, 3 to a designated position. An input control part 6a is connected to the analog controller 6, and a command for driving the x-axis and y-axis galvano-scanners 2, 3 can be manually entered from the input control part 6a.

The x-axis and y-axis galvano-scanners 2, 3 are respectively provided with, for example, a finite rotation-type motor 20, 30, as well as an x-axis and y-axis scanning mirror 21, 31 mounted on a motor rotation shaft 20a, 30a of the respective motor. A position sensor 22, 32 for detecting the rotation angle position of the motor rotation shaft 20a, 30a is attached to each of the x-axis and y-axis galvano-scanners 2, 3 respectively. An analog position detection output from the position sensor 22, 32 is fed to the analog controller 6 via the x-axis and y-axis scanner driver 4, 5 respectively. The analog controller 6 performs an analog-to-digital conversion to convert the analog position detection output to a digital position information. The digital position information is fed to the personal computer 7. A feedback control is performed on the x-axis and y-axis galvano-scanners 2, 3 according to a drive pattern set and entered in advance, based on the position of each of the x-axis and y-axis galvano-scanners 2, 3.

(Drive Pattern Creation Sequence)

A sequence for creating a pattern for driving the marking laser beam L (11) in the galvano-scanner system 1 will now be described.

Figure 2:
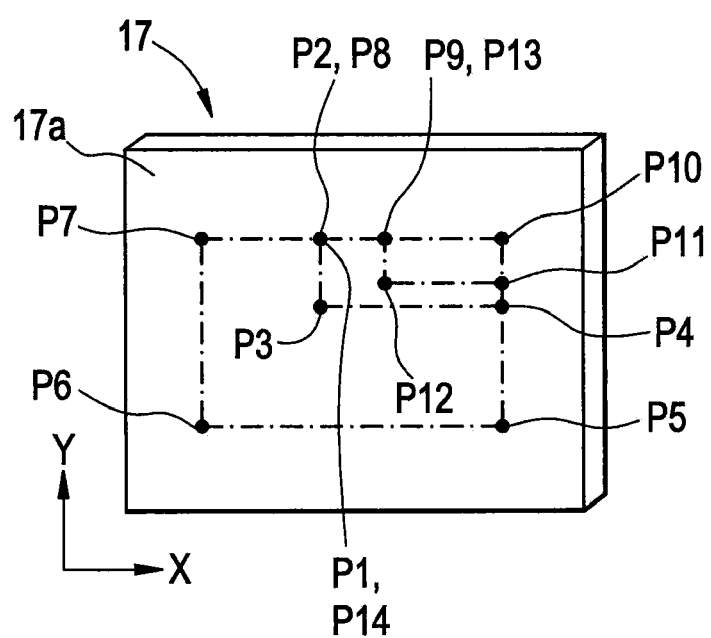
FIG. 2 is an illustrative drawing showing a master work.

First, there is made available a master work 17 having a plurality of positioning points defining a scan trajectory of the marking laser beam L (11), such as positioning points P1 through P14, displayed on a surface 17a, as shown in FIG. 2. The master work 17 is installed on the work table 15.

Next, the command generator 8 is set to teaching operation mode. The visible laser beam source 12 is thereby driven, the visible laser beam L(12) is emitted, and the visible laser beam L(12) is irradiated onto the surface 17a of the master work 17. An operator drives the x-axis galvano-scanner 2 and the y-axis galvano-scanner 3 from the input control part 6a of the analog controller 6 by manual operation while visually monitoring a beam spot of the visible laser beam L(12) formed on the surface 17a of the master work 17 and aligns the beam spot at a positioning point P1.

When an aligned state is created, the input control part 6a is operated, a sensor signal value from each of the position sensors 22, 32 of the x-axis and y-axis galvano-scanners 2, 3 is read, and the sensor signal value is recorded onto an internal memory device 6b or an externally provided external memory device 6c along with a reading sequence. Reading of the sensor signal value is only performed in an instance in which the input control part 6a is operated and a read command is entered; position information, elapsed time, and other information representing a movement trajectory during the aligning process are not recorded. Information representing an on/off state of the marking laser beam between each of the positioning points, i.e., in each section of movement, is entered by operating the input control part 6a and recorded onto the memory device 6b or 6c. Setting of the on/off state information can also be performed after the position information has been recorded. The recorded information is recorded in a form of a digital signal.

Similarly, when the beam spot is moved by manual operation to a next positioning point P2, and the beam spot is aligned at the positioning point P2, a sensor signal value is read and recorded onto the memory device 6b or 6c. Information regarding an on/off state of the marking laser beam is also recorded.

A similar recording operation is sequentially performed for positioning points P3 through P14. Positions at which the recording is commenced and terminated are indicated by performing an entry operation.

When recording has thus been performed for each of the positioning points P1 through P14, the recorded information is loaded into the personal computer 7 of the command generator 8, and a drive pattern is created based on the loaded information.

Figures 3A, 3B:
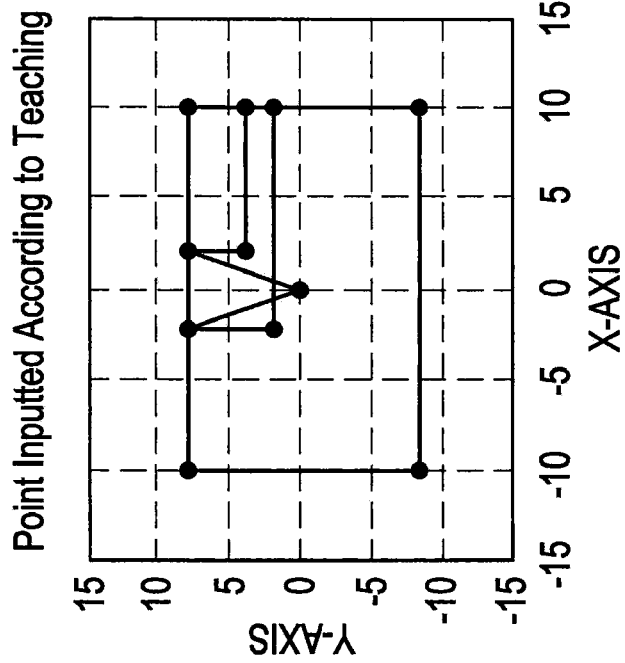
FIG. 3(a) is a table showing recorded data loaded by a teaching operation.
FIG. 3(b) is an illustrative drawing showing a deployed movement trajectory.

Next, for uses that require a high responsiveness and a high positioning accuracy, data recorded on the memory device 6b, 6c is loaded from the memory device 6b, 6c to the personal computer 7, then deployed on x-y coordinate axes, and a movement trajectory of the visible laser beam is determined. FIG. 3(a) is a table showing the loaded record data, and FIG. 3(b) shows the deployed movement trajectory. Trajectory coordinates of the movement trajectory can be amended at this point.

Next, a duration of movement within each section of movement (i.e., between adjacent positioning points) is individually entered against an x-axis trajectory and a y-axis trajectory of the movement trajectory, and deployed to a drive pattern for each of the axes. The respective duration of movement for each section of movement may be set as an identical value. FIG. 4 is a table showing the data after the duration of movement has been set. FIGS. 5(a) through 5(c) are illustrative drawings respectively showing an x-axis drive pattern, a y-axis drive pattern, and an on/off state drive pattern of the marking laser beam.

The drive patterns thus created (i.e., the x-axis drive pattern, the y-axis drive pattern, and the on/off state drive pattern of the marking laser beam) are entered and stored in a memory device of the personal computer 7. In an instance in which a marking operation is to be performed on the work 16, the work 16 is installed on the work table 15; then, a command generating program on the personal computer 7 is initiated, an input command is generated based on the drive patterns stored in the memory device, and the input command is transferred to the x-axis and y-axis scanner drivers 4, 5 via the analog controller 6. Synchronization control of the x-axis and y-axis galvano-scanners 2, 3 is performed either by the master analog controller, or between the x-axis and y-axis scanner drivers 4, 5.

Errors originating from effects of optics system error causes including focus error (pin cushion error) and attachment error, scale, offset, distance to the work surface and other causes of error are already removed from a drive pattern thus created. Therefore, a beam spot of the marking laser beam can be scanned along each positioning points on the surface 16a of the work 16 with a high degree of accuracy.

The description given above is for an example for the galvano-scanner system 1 having two axes; however, as shall be apparent, the present invention can be similarly applied for creation of a driver pattern of a galvano-scanner system having three axes.

Second Embodiment

In the method for creating a drive pattern described above, it is necessary to make available a master work for each iteration of work, scan the visible laser beam along each of the positioning points, and create a drive pattern. An instance in which marking or another laser processing is performed on a variety of types of work requires that the teaching operation by the visible laser beam for creating the drive pattern is performed for each iteration of work, and is therefore cumbersome.

It is therefore preferable that the teaching operation for the positioning points using a master work is performed once only, thereby creating an error correction map or an error correction function, and correcting a design coordinates data based on the error correction map or the error correction function.

In such an instance, a master work is made available, the master work having positioning points, each of which being provided at a representative position on a surface. A beam spot of a visible laser beam is aligned by manual operation at each of the positioning points of the master work, a sensor position signal from a position sensor is obtained, the obtained sensor position signal is loaded into the personal computer 7, and a measurement coordinates position data for aligning a marking laser beam to each of the positioning points is calculated. Then, an error between design coordinates position data representing each of the positioning points and the measurement coordinates position data actually obtained is calculated. A correction map in which the calculated error is allocated to each of the positioning points, or an error correction function that can eliminate the error at each of the positioning points, is created.

When performing a marking operation on a work, the design coordinates data entered from an input part of the personal computer 7 are corrected using the correction map or the error correction function, and the design coordinates data after correction are fed to the analog controller 6 as an input command. In order to increase the accuracy of error correction, the number of teaching operations performed on the positioning points is increased.

Figure 6A:
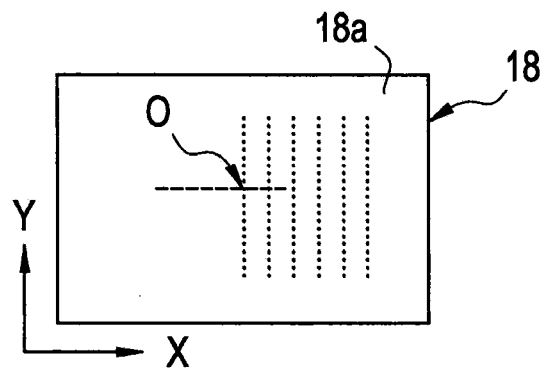
FIG. 6 is an illustrative drawing showing a master work for reading a correction value, an illustrative drawing showing a state in which a rectangular input command is distorted as a result of an error, a graph showing coordinates data obtained by the teaching operation, a graph showing design coordinates data, a graph showing a calculated error correction amount, and an illustrative drawing showing a rectangle formed without distortion by an input command that takes the error into account.

A procedure for creating the error correction map will now be described with reference to FIG. 6. First, a master work 18 is made available, the master work 18 having a plurality of rows of positioning points that are arranged in a y-axis direction at regular intervals, the rows being arranged in an x-axis direction at regular intervals on a surface 18a, as shown in FIG. 6(a). A visible laser beam is irradiated onto each of the positioning points on the master work 18, a beam spot of the visible laser beam is sequentially aligned at each of the positioning points, and a sensor position signal obtained from the position sensors 22, 32 at each of the positioning points is read.

Figure 6B:
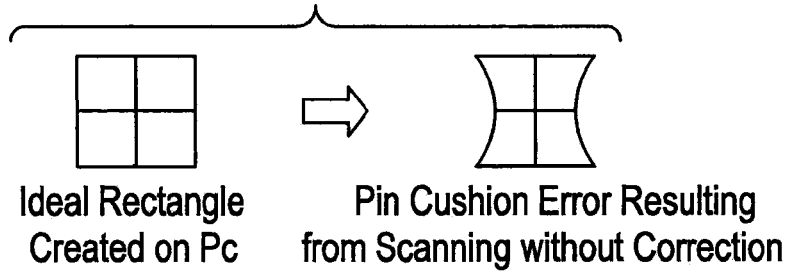
Figure 6C:
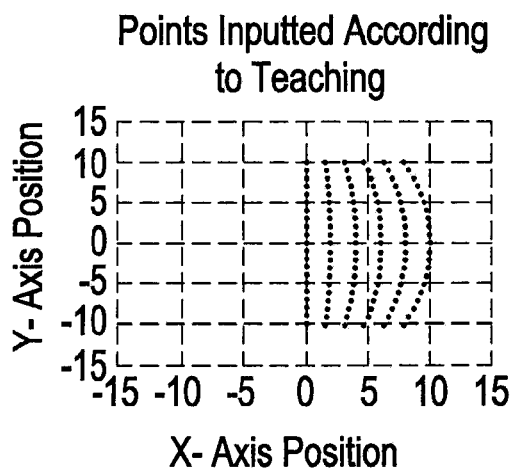
Figure 6D:
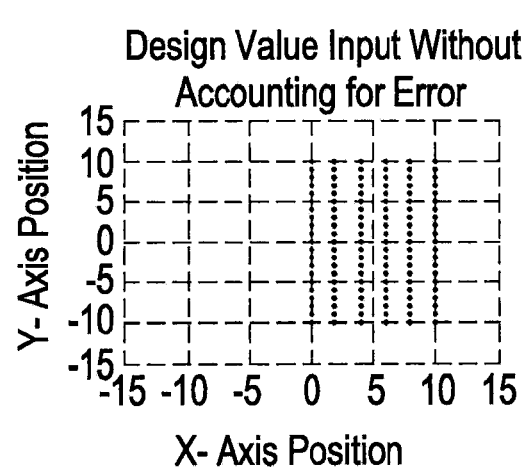
Figure 6E:
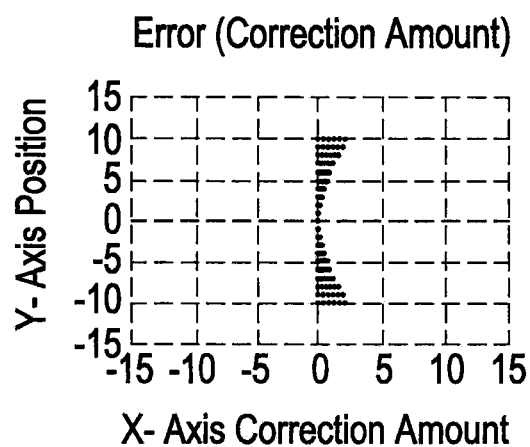

A straight line traced by the visible laser beam on the surface 18a of the master work 18 increases in curvature relative to a scanner angle with increasing distance from an optical origin O, as shown in FIG. 6(b). Therefore, the measurement coordinates data calculated according to the sensor position signal representing each of the positioning points that are linearly arranged include the effect of distortion by the optics system such as that described above, and therefore curves in a reverse direction as shown in FIG. 6(c). A difference between the measurement coordinates data shown in FIG. 6(c), and the design coordinates data shown in FIG. 6(d) that does not take an error into account, represents an amount of error. The error amount is shown in FIG. 6(e).

Figure 6F:
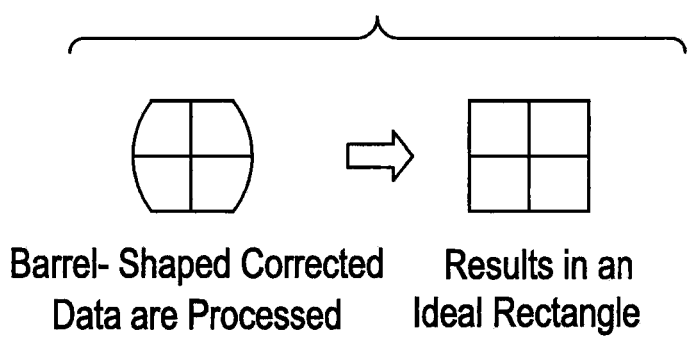

Therefore, correction is performed on the design coordinates data that have been entered so that the error amount is removed, and an input command for driving is thereby created. As a result, a correction shown in FIG. 6(f) is performed. The marking laser beam thereby moves on the work along a linear movement trajectory, making it possible to perform the marking operation in an accurate manner without being affected by errors caused by distortion in the optics system and other causes.

Third Embodiment

Figure 7A:
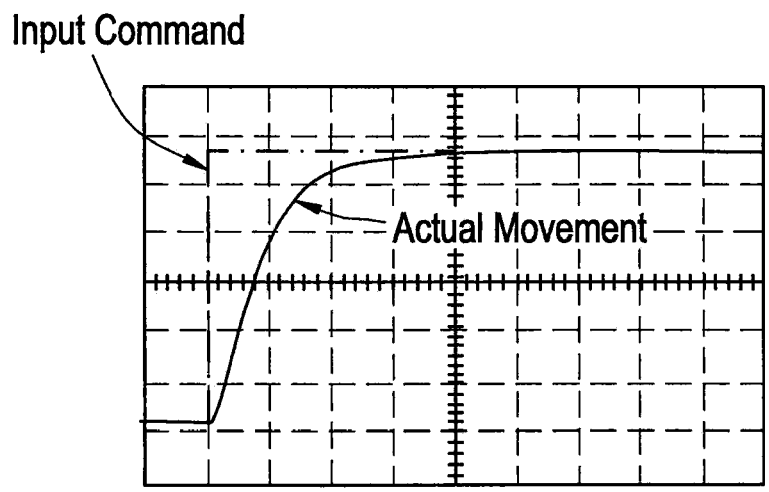
FIG. 7 is a graph showing a drive state in which no overshooting occurs and a drive state in which overshooting occurs.
Figure 7B:
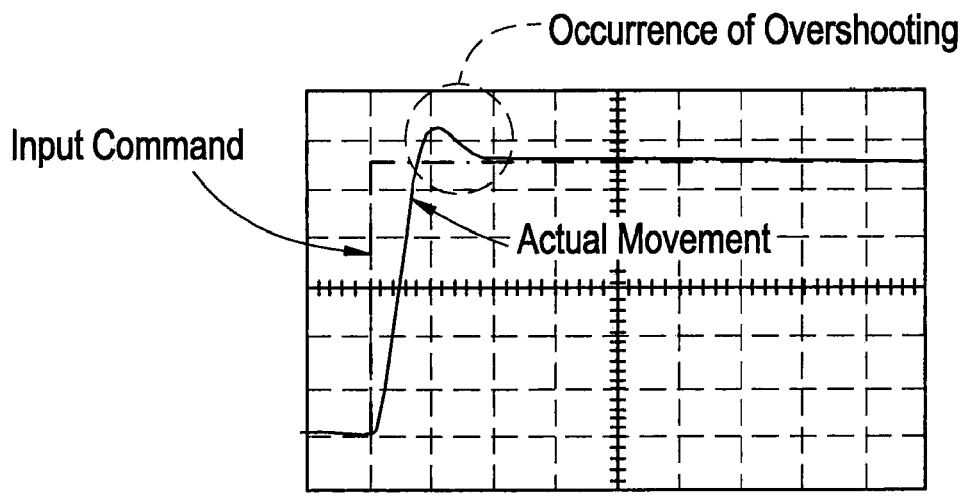

Normally, the galvano-scanner system 1 is driven according to a drive pattern that is in accordance with adjustment conditions that have been set in advance, and a maximum degree of responsiveness and positional accuracy can thereby be obtained. Often, in an instance in which the galvano-scanner system is driven according to a drive pattern under conditions that are more severe than the adjustment conditions, overshooting occurs during alignment at a positioning point, vibration about the positioning point occurs, and responsiveness and accuracy of alignment decrease. FIG. 7(a) shows an example of a driving operation (i.e., actual movement) performed in accordance with a drive pattern (i.e., command input value) having a small vibration width in accordance with adjustment conditions set in advance, and FIG. 7(b) shows an example of a driving operation due to a drive pattern having a large vibration width exceeding the adjustment conditions.

In order to decrease the tact time, it is necessary to increase the movement speed when the laser is in an off state so as to minimize the duration of movement not related to laser irradiation. However, when the movement speed is increased, overshooting is generated during alignment to a positioning point immediately after a movement at a high speed, and settling time becomes necessary. Therefore, movement speed and alignment accuracy are in a trade-off relationship, and it is difficult to improve both at the same time.

According to a third embodiment of the present invention, correction is performed on the created drive pattern, and the duration of movement is shortened while a decrease in the alignment accuracy is minimized, as described below. A method of creating a drive pattern is similar to that according to the first embodiment described above, and a description is therefore omitted.

After the drive pattern is created, a section of movement having drive conditions that satisfy the adjustment conditions is inserted, for example, forward of a positioning completion point of a section of movement extracted according to predetermined conditions, and an end point of the inserted section of movement is caused to coincide with the initial positioning completion point.

Figure 8B:
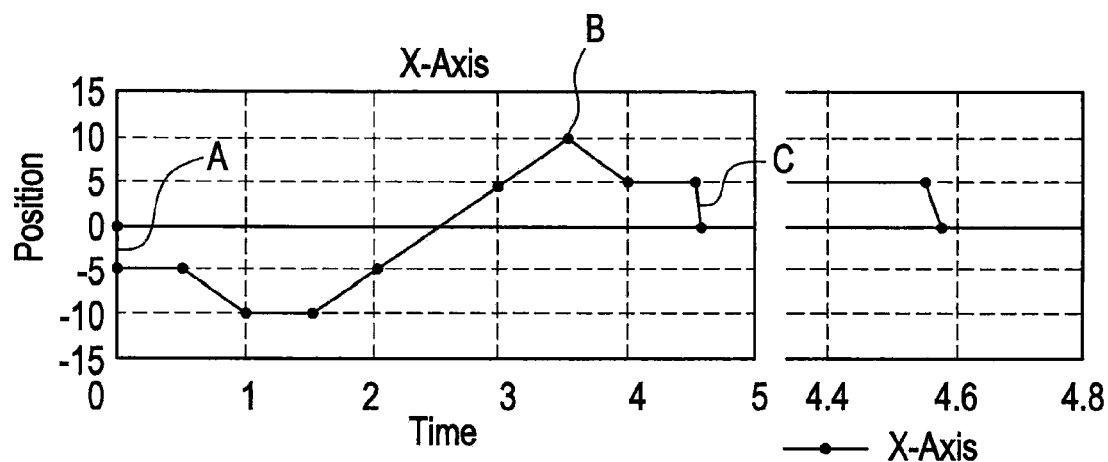
FIG. 8 is a table showing a drive pattern containing a section of movement in which overshooting occurs, a graph showing a corresponding X-axis drive pattern, and a graph showing a corresponding Y-axis drive pattern.
Figure 8C:
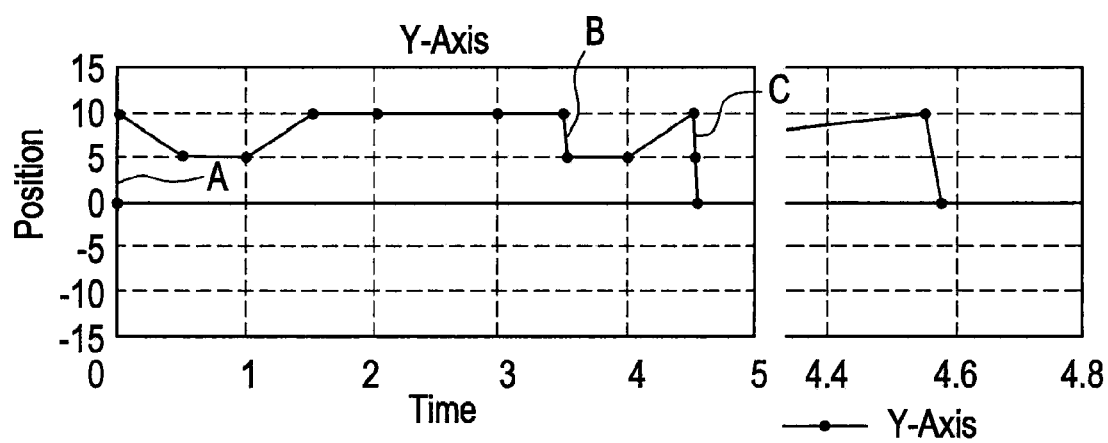

A description will be given for an example in which a driving operation is performed along positioning points (i.e., steps 1 through 14) shown in FIG. 8. In this instance, a high speed driving operation of 400 rad/s is performed in a laser-off state in a section of movement A between the positioning point 1 and the positioning point 2. A similar driving operation is performed in a section of movement B between the positioning point 8 and the positioning point 9, and a section of movement C between the positioning point 11 and the positioning point 12. In such sections of movement at a high speed, vibration due to overshooting is generated at respective positioning completion points of each of the sections of movement, i.e., at positioning points 2, 9, and 12. A portion corresponding to the section of movement C is shown with an expanded time axis on the right-hand side of FIG. 8.

As shown in FIG. 9, a section of movement A1 representing a very small amount of movement between a positioning point 1a and the positioning point 2 is added forward of the positioning point 2 on the section of movement A. The movement within the section of movement A1 is set so that the movement speed is at a low speed of 10 rad/s and the movement distance is also very small. Using similar conditions, a section of movement B1 between a positioning point 8a and the positioning point 9 is added forward of the positioning point 9 on the section of movement B, and a section of movement C1 between a positioning point 11a and the positioning point 12 is added.

Sections of movement that are newly inserted are imparted with conditions according to vibration width, speed, responsiveness, and similar parameters, and may comprise a straight line or a continuation of straight lines having different speeds.

Vibration at the positioning points 2, 9, 12 can thereby be minimized without establishing unnecessary standby times.

Movement while the laser is in an off state can be controlled as conventionally performed without problems, since there is no need to account for the energy density of the laser.

The invention claimed is:

1. A method for creating a drive pattern for a galvano-scanner system comprising a galvano-scanner capable of scanning a main laser beam and a visible laser beam in a predetermined direction, a scanner driver for driving the galvano-scanner, and a controller for controlling the scanner driver, comprising:
   making available a master work, having displayed on a surface a plurality of positioning points for defining a scan trajectory followed by the main laser beam;
   sequentially performing, for each of the positioning points, a teaching operation in which the visible laser beam is irradiated onto the surface of the master work, the galvano-scanner is operated by manual operation via the scanner driver, a position of irradiation of the visible laser beam on the surface is aligned at one of the positioning points by visual observation, position information of the aligned galvano-scanner is obtained from a position sensor attached to the galvano-scanner, and the position information is recorded;
   deploying the position information obtained for each of the positioning points in a sequence in which each of the position information was obtained, and determining a trajectory over which the visible laser beam moves;
   setting, individually or as a whole, a duration of movement within each section of movement on the movement trajectory;
   setting the main laser beam in an on/off state at each position of movement on the movement trajectory; and
   generating a pattern for driving the main laser beam based on the movement trajectory, the duration of movement, and the information relating to the on/off state of the main laser beam.

2. The method for creating a drive pattern for a galvano-scanner system according to claim 1, wherein the galvano scanner comprises at least an x-axis galvano-scanner and a y-axis galvano-scanner, each of which galvano-scanners capable of scanning the main laser beam and the visible laser beam in an x-axis direction and a y-axis direction respectively.

3. The method for creating a drive pattern for a galvano-scanner system according to claim 1, further comprising:
   determining a difference between design coordinates representing each of the positioning points defining the scan trajectory followed by the main laser beam and measurement coordinates representing each of the positioning points obtained by the teaching operation;
   calculating, based on the difference, a correction map or a correction formula representing an error correction amount for each of the design coordinates positions;
   performing a correction, using the correction map or the correction formula, on the design coordinates for aligning the main laser beam at a predetermined positioning point; and
   generating a drive command corresponding to the coordinates after correction.

4. The method for creating a drive pattern for a galvano-scanner system according to claim 1, further comprising:
   extracting a section of movement in which overshooting is likely to occur, when scanning the main laser, at a positioning completion point in each section of movement in the generated drive pattern;

inserting an auxiliary section of movement, provided with a drive condition that can minimize overshooting, forward of the positioning completion point of the extracted section of movement;

causing an end point of the auxiliary section of movement to coincide with the positioning completion point; and using an amended drive pattern after insertion of the auxiliary section of movement as the pattern for driving the main laser beam.

* * * * *